UNITED STATES PATENT OFFICE.

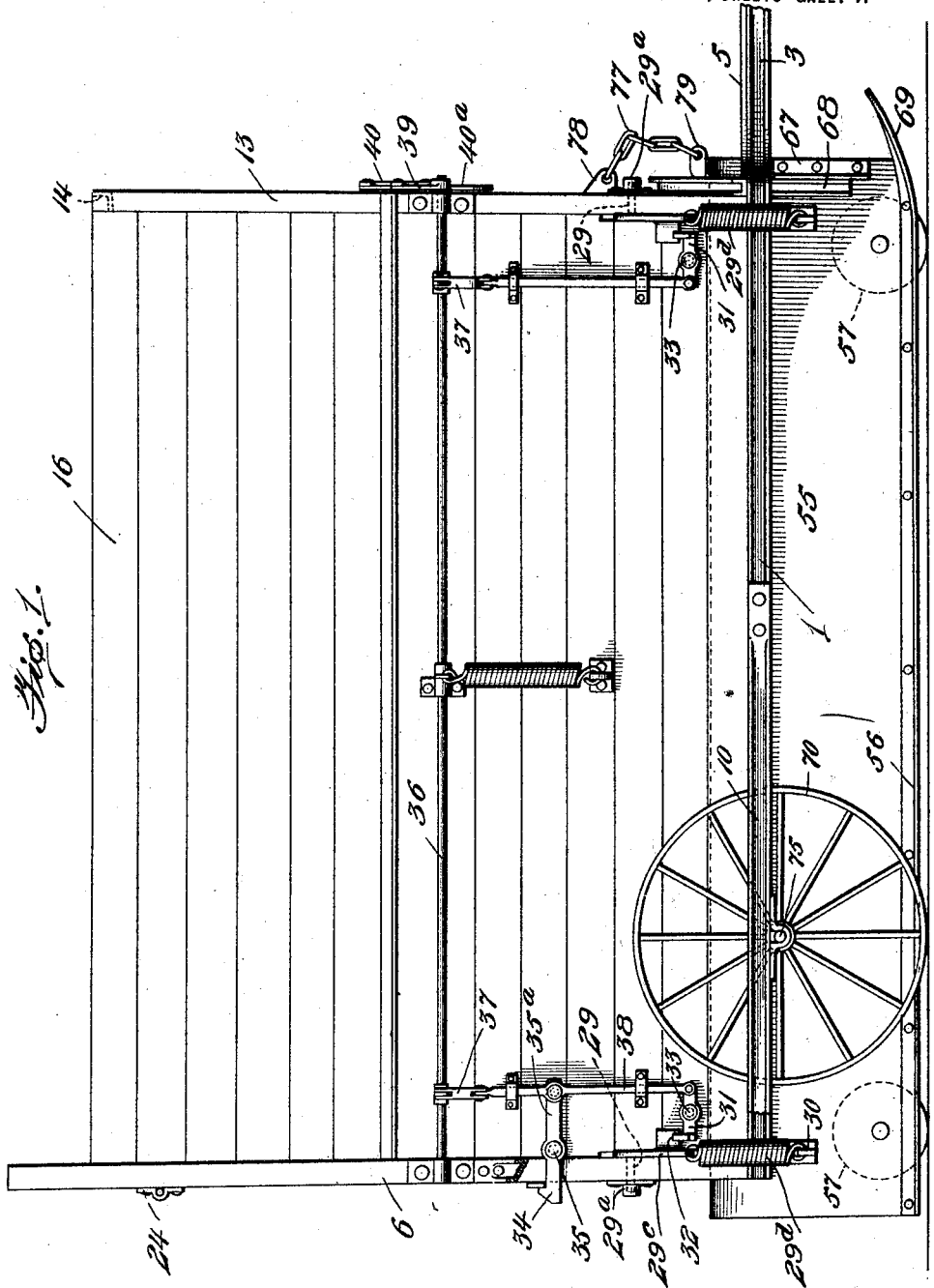

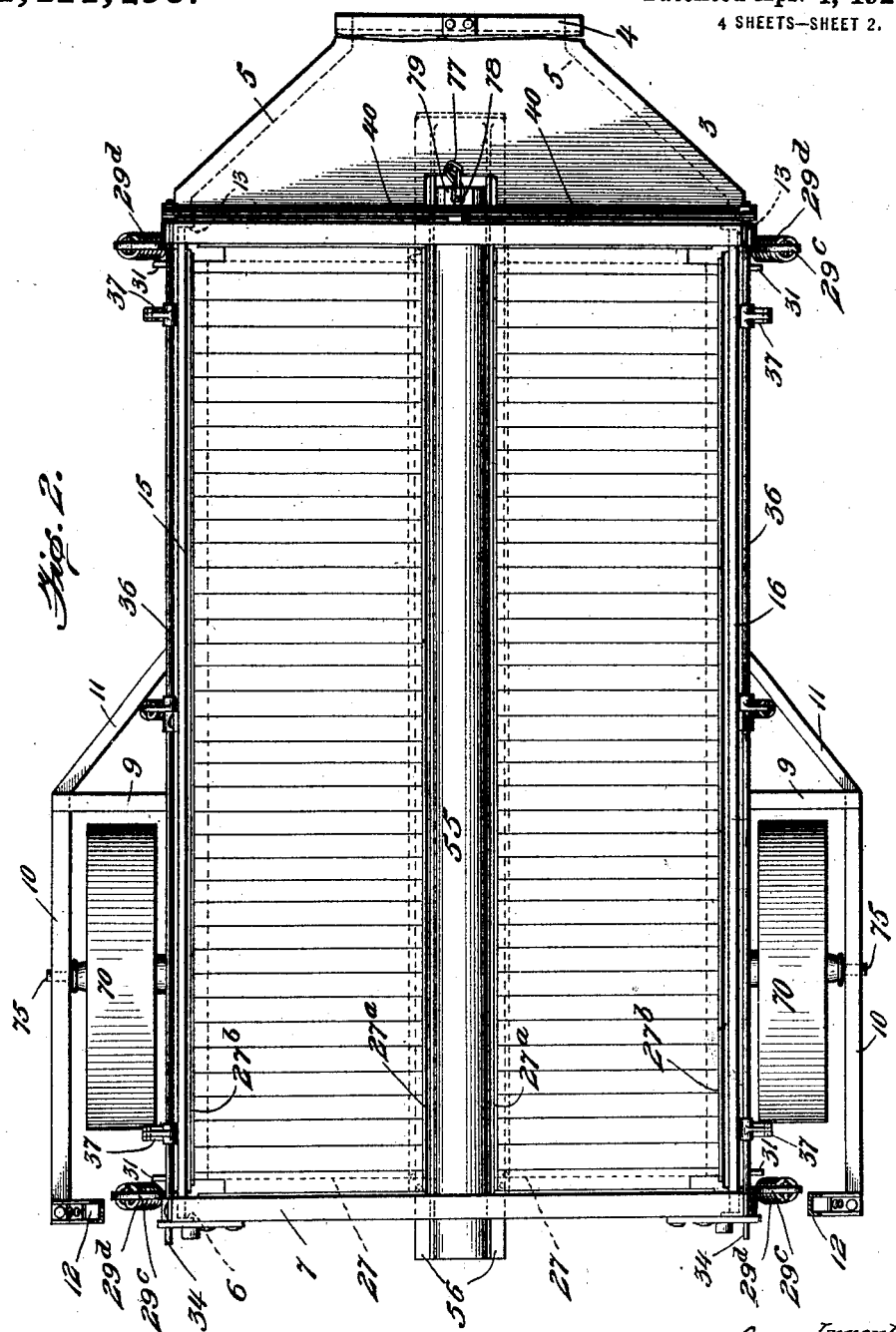

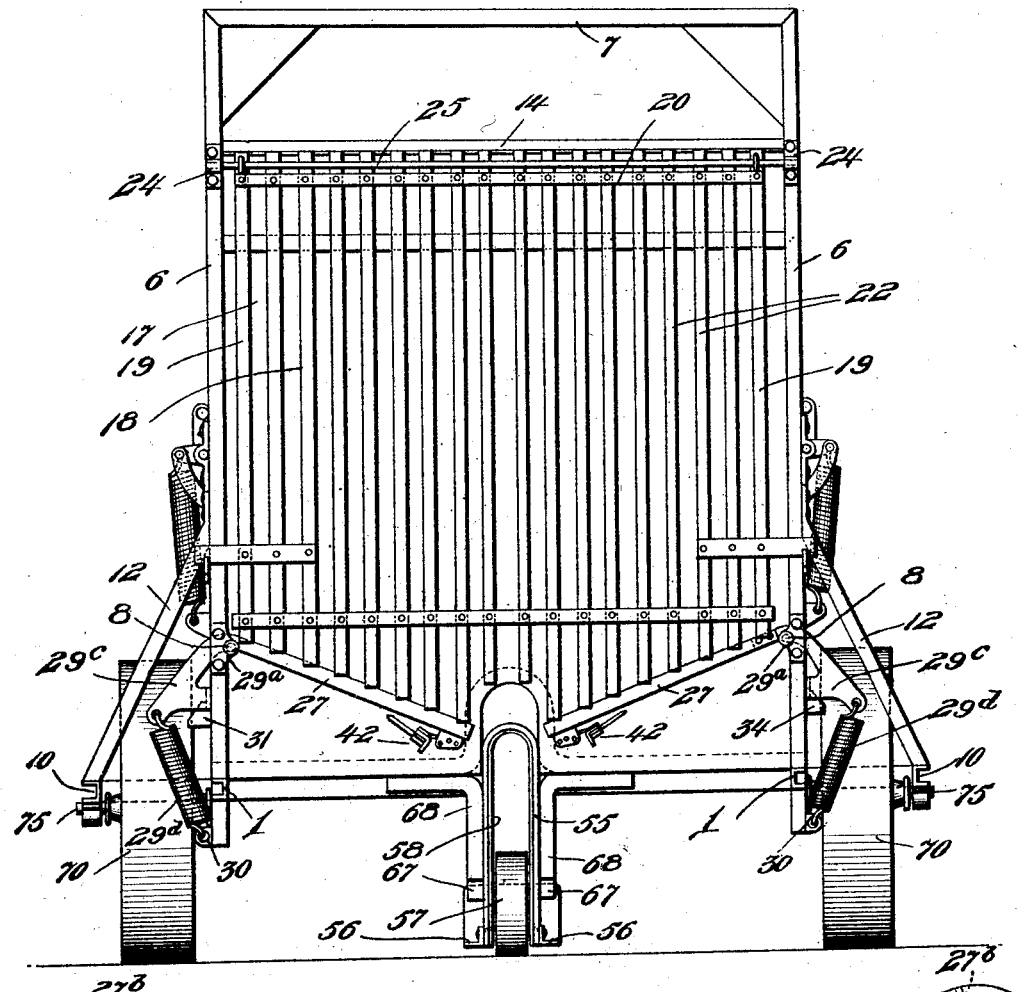
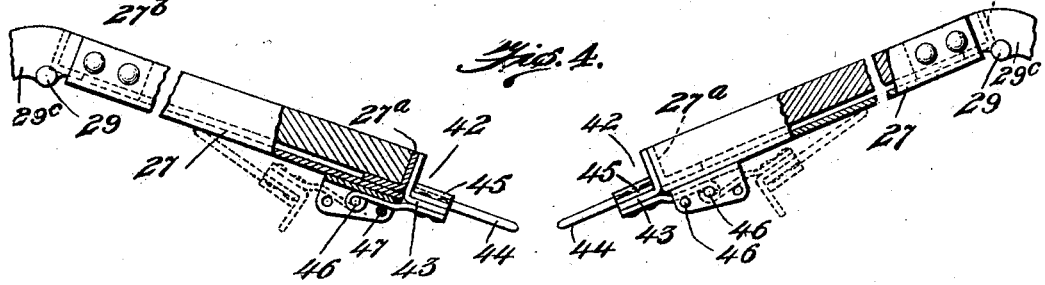

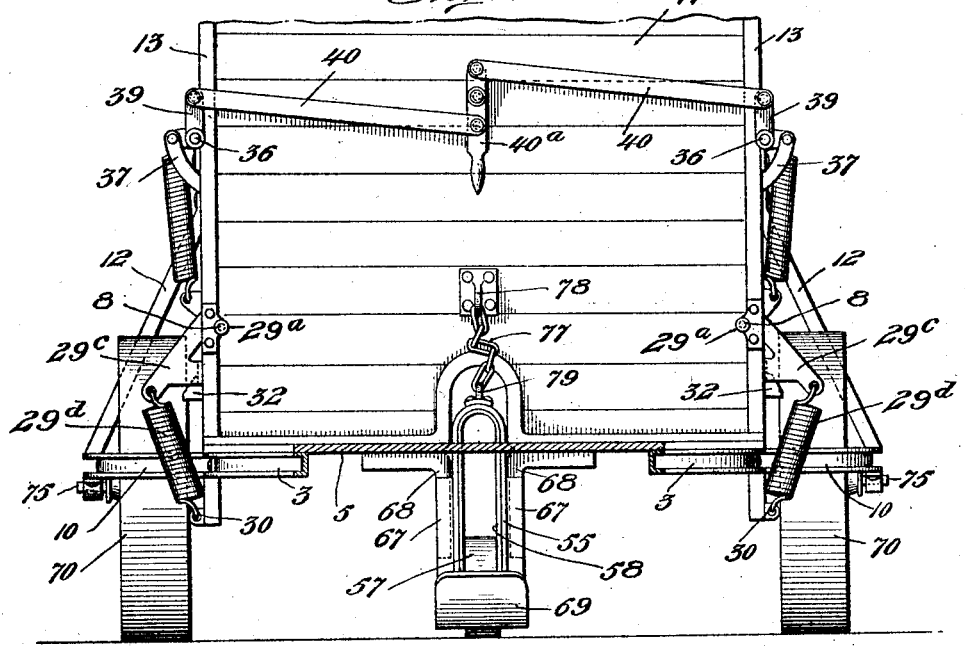
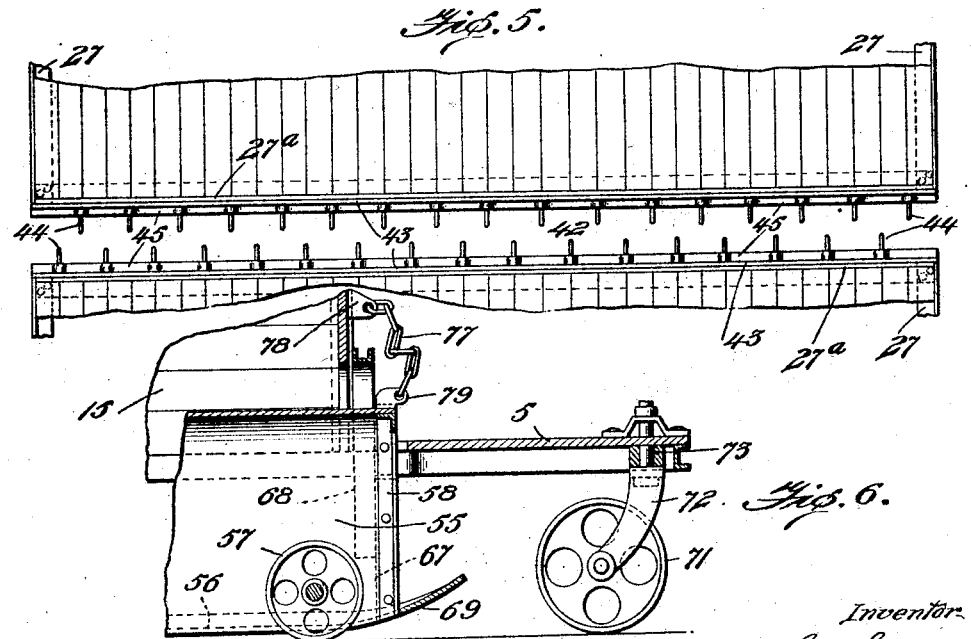

DAVID M. GRAHAM, OF BORDULAC, NORTH DAKOTA, ASSIGNOR TO GRAHAM-ROACH HARVESTER AND STACKER COMPANY, A CORPORATION OF NORTH DAKOTA.

STRAW-STACK-FORMING APPARATUS.

1,411,490.     Specification of Letters Patent.     Patented Apr. 4, 1922.

Application filed May 20, 1918, Serial No. 235,546. Renewed June 27, 1921. Serial No. 480,909.

*To all whom it may concern:*

Be it known that I, DAVID M. GRAHAM, citizen of the United States, residing at Bordulac, in the county of Foster and State of North Dakota, have invented certain new and useful Improvements in Straw-Stack-Forming Apparatus, of which the following is a specification, reference being had therein to the accompanying drawing.

This invention relates to improvements in mechanism for receiving from harvesters or grain cutting machines the newly cut straws still carrying the grain and, simultaneously with the cutting, forming a relatively large mass of the straws while loose and unbound, putting them into more or less compact condition and then delivering them to the ground as a stack in which the grains can be allowed to remain until they have been thoroughly cured and conditioned and made ready for threshing.

In the drawings I have shown one of the forms of mechanism embodying my improvements.

Figure 1 is a side elevation of such a stack-forming apparatus.

Fig. 2 is a top plan view.

Fig. 3 is a rear end elevation.

Figs. 4, 5, 6 and 7 show details.

A main frame or base frame is provided, consisting of sills 1, and a front cross girt 2. Beyond this girt there extends forward a supplemental frame having the side bars 3, the front cross bar 4, and the platform 5, these parts being supplementally braced as necessary. From this lower horizontal main frame there rises a vertically positioned framework comprising the vertical posts 6 and the rigidly connected crossbar 7 at their upper ends. Between this upright frame and the horizontal frame there are bracing structures, each comprising a horizontal element having one or more bars 9, rigid with and extending out from the horizontal part of the main frame, the short sill 10, the inclined brace 11, and the upright elements having the brace rods 12 extending from the horizontal part of the sub-structure to the upper ends of the posts 6.

At the front end there are vertical corner posts 13 rigidly secured to the sills 1 of the bottom frame, and at their upper ends connected by the cross bar 14. As many as possible of these sills, girts, uprights and braces are formed of suitable channel, or other structural metal, shapes suitable for securing the utmost possible strength with a minimum weight.

To the framework thus provided are secured the parts which constitute an inner side wall 15, an outer side wall 16, and a front end wall 17, together with a swinging gate structure 18, at the rear end. The side walls can be in many respects duplicates of each other; each, as shown, being formed of a series of light boards 15ª, placed suitably close together, and each rigidly secured at its ends to one of the front posts 13 and one of the rear posts 6. The front end wall, composed of similar boards or plates which extend across from one of the side walls 15 to the other, is rigidly secured to the two front corner posts 13, 13.

The gate structure indicated as a whole by 18 comprises a frame having vertical bars 19, 19, rigidly connected by an upper cross bar 20 and a lower bar 21. 22, 22, indicate vertical slats intermediate of the bars 19 secured rigidly to the frame bars 20, 21, and positioned in such a way as to lighten the gate and at the same time maintain strength and durability.

The lines of the bottom edges of the gate diverge from the center, transversely, for a purpose to be described.

The gate is pivotally connected by suitable hinges at 24 to the main frame. As shown the end parts of a cross hinge rod 25 are supported on the uprights 6, 6, preferably by means of bearings secured to the latter.

The bottom part of the receptacle having, as above described, the front wall 17, the side walls 15, 16, and the gate 18, is constructed as follows: It is formed in two half parts or sections, which swing in transverse planes. Each half section comprises a framework having elements 27 at the ends, a connecting element 27ª at the inner edge, and a connecting element 27ᵇ at the outer edge, these being bars of angle metal by preference; and also a floor structure or straw support which may be formed of slats or rods, though I find advantageous a floor formed of short boards fitted together, extending in transverse planes and secured to the flanges of the frame elements 27ª and 27ᵇ. For purposes to be described, I position the two bottom sections in such way that their inner edges (along the frame bars 27ª) are some distance apart, leaving a longitudinally extending open space at the center of the bottom. This can be closed, however, by means of a movable sub-section indicated as an entirety by 42. It comprises a supporting frame bar 43 and a series of fingers 44, secured to the bar 43 by one or more clamps 45. It is hinged at 46 and can be turned back under the main half section, as shown in Figs. 3 and 4 so as to be idle when not in use. When this sub-section 44 is moved up into operative position it can be locked in any suitable way as pins or bolts, as at 47, and it can be similarly locked when thrown out of action.

Each bottom half is pivotally supported by devices at an axis 8. As shown, there is a short hinge pintle 29 mounted in a bearing 29ª secured to the frame, one at the rear end and the other at the front. 29ᵇ is a bracket secured to the frame bars 27 and 27ᵇ and carrying the hinge pintle to turn therewith, it being cast with a crank arm 29ᶜ, which extends outward. 29ᵈ is a spring connected to the crank 29ᶜ and to a bar at 30 secured to the frame, the springs 29ᵈ (front and rear) tending, normally, to swing the inner edge of the bottom half upward. 31 is a catch having its active part 32 in the path of the crank arm 29ᶜ or a suitable lug thereof and adapted to be automatically moved by it as it moves to its limit in one direction. The catch bar 31 is pivoted at 33 and normally held in its operative position by a spring 33ª.

The gate is held closed by means of hook catches 34 pivoted at 35 to the frame. Each gate catch can be opened at option by means of a crank extension 35ª.

The locks at 31 for the two halves of the bottom and the gate catches 34 can all be opened by the operator on the platform of the machine by rock rods 36, each being connected by devices at 37 with a gate catch 34 and by devices at 38 with the bottom locks 31. There are two of the locks 31 on each side of the machine for the sections of the bottom, and one of the gate locks 34 on each side. The two operating rods 36 are each connected to a spring 33ª and at the front end of the machine are connected by cranks 39 and links 40 so that all of the parts last specified can be simultaneously opened by lever 40ª.

The receptacle and the above described parts are mounted upon suitable wheels. 70, 70 are relatively large wheels on an axis near the rear end of the machine; and at the front there is a castor wheel 71 carried by a standard 72 pivoted to the front frame at 73.

The two rear wheels are mounted on stud axles 75 which are secured to the bars 1 and 10 of the horizontal base frame.

The receptacle is drawn across the field by any suitable draft devices on each mechanism.

One of the uses to which a mechanism such as above described can be put is the taking of loose unbound straws of wheat or other grain directly from the harvesting machine and immediately after it has been cut. In such case it can be attached to the side of the harvester, or grain cutting mechanism, by any suitable devices, of which I have devised a number of forms that are illustrated in other applications for patent, or it can be independently drawn. The straws are allowed to accumulate in the receptacle and are, if desired, packed more or less. The capacity of the vehicle is such as to allow it to receive the straws cut by an ordinary sickle apparatus over a swath of eighty rods or thereabouts, assuming the straws to be of average length and number per square foot.

After the receptacle has received the mass condensed and disposed as desired it can be quickly discharged and left standing upon the ground as a stack mass. When operating in this way the subsections or extension sections 42 of the bottom are turned up and fastened in operative position so as to support the straw which is deposited at the center, transversely, of the bottom.

Generally, when using the mechanism in this manner, I deposit two or three adjacent stacks of the character above described and then arrange them so as to be properly cured.

Under many circumstances I prefer to form ventilating air passages through the smaller stack masses at the time they are deposited. And for this purpose I employ the following devices:

55 represents a duct, formed preferably of sheet metal. It is of such vertical dimensions as to extend from a plane at or near the ground surface up far enough to have its upper part 66 lie normally in a plane some inches above the plane of the edges 27ª of the main floor sections. When the air duct is in use the extension subsections 42 are turned back to their inoperative positions.

The duct former 55 has its lower edges stiffened and braced by angles 56 and it is provided with rollers or wheels 57, mounted in suitable stiffening bars or loops 58, secured to the inner surface of the sheet metal. The duct former is adapted to rise and fall at either end; or, bodily, from end to end. As shown, this is accomplished by having vertically arranged bars 67 secured to its outer surface near the front end, which are engaged by downwardly projecting bracing and guiding bars 68, carried by the front part of the main frame.

The upper part 66 of the duct former lying between the inner edges of the two bottom sections 27ᵃ serves as a closure for the space between them, and the said edges of the bottom section serve as holders to keep the duct former in proper line from end to end. The base part of the duct former is carried forward and turned up around the front end, and to be more or less shoe-like, as shown at 69.

This duct former 55 is detachable readily and can be removed from the apparatus when it is desired to deposit stack masses in the way first above described.

The duct-former is movably and separably connected with the stack forming receptacle by a short chain 77 and eyes or hooks therefor 78 and 79, this chain having some slackness to permit of said vertical movement of the duct-former.

When it is in use, the straw mass, which descends when the bottom sections are dropped, is deposited directly upon the former and settles upon its top end down by and around its sides; and as the machine advances the duct former is drawn from beneath the mass and leaves an air duct approximating in conformation and dimensions those of the duct former. By having the stack mass somewhat deeper along the central longitudinal vertical planes there is an increase in the weight relatively, and that part of the mass along those planes and the straws are there somewhat more densely packed, the consequence being that those which lie around the top of the duct former tend to maintain their position and settle into the air aperture to a less extent than when the bottom surface of the mass in the receptacle is approximately horizontal. The pressure of the mass, however, while in the receptacle, is not so great as to prevent all of the necessary movement, vertically, of the air former when moving along below the receptacle.

I have heretofore made numerous stackers with the air-duct-former rigidly mounted on the upper surface of a single continuous bottom element in the receptacle which required that the entire bottom should be lowered from plane to plane in parallelism with itself and that it should, as an entirety, have more or less of a bodily movement longitudinally of the vehicle. With the present structure no longitudinal movement of any part of the bottom is necessary. The load drops instantly along the vertical lines of the receptacle; and nothing is required to be drawn out from below it except the smooth sheet metal duct-former.

With an apparatus of this sort I provide the farmer with means for handling various materials and handling any one material in several ways by simple and durable mechanism.

What I claim is:

1. In a straw stack forming apparatus, the combination of the traveling straw receptacle, and an air duct-former normally outside of and connected to the receptacle and arranged to have the straw mass delivered from the receptacle directly thereon.

2. In a straw stack forming apparatus, the combination of the duct-former arranged in a relatively low position, and the traveling straw receptacle having straw supporting and discharging elements normally in relatively elevated positions and which are laterally movable independently of the duct-former.

3. In a straw stack forming apparatus, the combination of the traveling straw receptacle, and an air duct-former arranged to travel with the receptacle, the straw supporting and delivering devices of the receptacle being movable to their positions of discharge independently of the duct-former.

4. In a straw stack forming apparatus, the combination of an air duct-former normally traveling on the ground, and the straw receptacle supported independently of the duct former and having straw supporting and discharging elements arranged to discharge the straw upon the duct-former.

5. In a straw stack forming apparatus, the combination of the traveling straw receptacle, and an air duct-former outside of the receptacle and detachably connected therewith.

6. In a straw stack forming apparatus, the combination of the straw receptacle, an air duct-former outside of and directly below the receptacle, and means for depositing the straw mass from the receptacle upon the duct-former.

7. In a straw stack forming apparatus, the combination of the straw receptacle, and the air duct-former outside of and detachably connected to the receptacle and arranged to have the straw mass delivered from the receptacle upon the top of the air duct-former.

8. In a straw stack forming apparatus, the combination of the receptacle having the straw supporting bottom, and the traveling air duct-former movable vertically independently of said bottom.

9. In a straw stack forming apparatus, the combination of the wheel supported receptacle, the air duct-former supported vertically independently of and traveling with the receptacle, the draft devices at the front end of the duct-former, and means for bracing the rear end of the duct former against lateral movement.

10. In a straw stack forming apparatus, the combination of the wheeled receptacle, the air duct-former supported vertically independently of and traveling with the receptacle, and the draft devices connected to the duct-former and arranged to move vertically independently of the receptacle.

11. In a straw stack forming apparatus, the combination of the receptacle, the traveling air duct-former below and movable vertically independently of the receptacle, and the draft devices at the front end of the duct-former.

12. In a straw stack forming apparatus, the combination of the receptacle, the traveling air duct-former movable vertically relatively to the receptacle, and draft and bracing devices at the front end of the duct-former engaging said front end for holding it in predetermined alignment.

13. In a straw stack forming apparatus, the combination of the receptacle, the traveling air duct-former normally below and movable vertically relatively to the receptacle, the draft devices at the front end of the duct-former and bracing devices engaging the rear end of the duct-former for holding it in predetermined alignment.

14. In a straw stack forming apparatus, the combination of the wheel supported receptacle, the traveling air duct former, the draft devices attached to the front end of the duct-former and means engaging the upper part of the rear end of the duct former to prevent lateral movement of the said end.

15. In a straw stack forming apparatus, the combination of the wheel supported receptacle, the traveling air duct former normally below the receptacle, the draft devices for positively advancing the duct former and means carried by the receptacle bearing separably against the duct former to prevent lateral movement.

16. In a straw stack forming apparatus, the combination of the wheel supported receptacle, the air duct former traveling with the receptacle, and independently wheel supported.

17. In a straw stack forming apparatus, the combination of the wheel supported receptacle, the air duct former traveling with the receptacle and supported directly upon the ground independently thereof.

18. In a straw stack forming apparatus, the combination of the receptacle having a straw supporting bottom provided with an opening therethrough, of the air duct-former below the receptacle and having a closed top arranged to operate as a closure for the said opening.

19. In a straw stack forming apparatus, the combination of the receptacle having a straw supporting bottom provided with an opening therethrough, of the air duct former supported vertically independently of the receptacle and provided with a closed upper side, movable vertically through the said opening.

20. In a straw stack forming apparatus, the combination of a straw receptacle adapted to form a solid imperforate stack mass, an air duct-former traveling in the vertical planes of the path of the receptacle and normally outside thereof, the receptacle having straw supporting and discharging elements arranged to deposit the straw from the receptacle in a mass, and means for drawing the air duct-former out from under the straw mass.

21. In a straw stack forming apparatus, the combination of the straw receptacle, and an air duct-former supported independently of the receptacle and traveling in the vertical planes of its path, the receptacle having straw supporting and discharging elements arranged to deposit the straw mass on the duct-former.

22. In a straw stack forming apparatus, the combination of a traveling air duct-former, a straw receptacle arranged directly above the duct-former and having straw supporting and discharging elements arranged to deliver the straw mass from the receptacle upon the duct-former, and means for drawing the duct-former out from under the straw.

23. In a straw stack forming apparatus, the combination of the traveling air duct former, a straw receptacle arranged directly above the former and means for causing the straw mass from the receptacle to move down around the sides of the duct former as the straw is moving from the receptacle toward the ground.

24. In an apparatus for forming stack masses of loose unbound straws, a traveling receptacle having a bottom structure formed with straw supporting parts which are movable laterally from beneath the straw mass to permit it to drop directly downward to the ground and having a movable gate to permit the receptacle to move freely away from the upper part of the stack mass in combination with an air duct-former normally below the receptacle, and relatively to which the straw moves downward as it drops from the receptacle.

25. In an apparatus for forming stack masses of loose unbound straws, the combination of an air duct former and a traveling receptacle normally above the former, and said receptacle having a downwardly movable straw supporting bottom element adapted to move towards the ground on lines outside of the path of the duct former.

26. In an apparatus for forming stack masses of loose unbound straws, the combination of the traveling receptacle having a downwardly movable straw supporting and discharging bottom element adapted to move downward, and an air duct former supported below the receptacle to travel in horizontal planes above those of the lower part of said bottom element when in its lowest position.

27. In an apparatus for forming stack masses of loose unbound straws, an air duct former normally moving on lines relatively near the ground, and a straw receptacle above said former having a bottom structure formed in two sections which are movable independently of the air former out from under the load mass and arranged to move in lines outside of the path of the former to deliver the straws to points below the top thereof.

28. In an apparatus for forming stack masses of straw, a traveling receptacle having a bottom structure formed in two oppositely movable laterally extensible sections.

29. In an apparatus for forming stack masses of straws, the combination of the traveling receptacle having a bottom structure with an opening therethrough, and an air duct former below the receptacle, and positioned in the vertical planes of the said opening, said bottom structure being formed of two laterally extensible oppositely movable sections.

30. In an apparatus for forming stack masses of straw, the combination of a traveling receptacle having a bottom structure formed in two sections, which are normally inclined toward each other and an air duct former below the receptacle positioned in longitudinal vertical planes adjacent those of the lowermost parts of said bottom sections.

31. In an apparatus for forming stack masses of straws, a traveling receptacle having a bottom structure, formed in two oppositely movable sections, and an air duct former below the receptacle, each of said sections being supported at a fixed axis and having a part movable to horizontal planes below the top of the former.

In testimony whereof, I affix my signature.

DAVID M. GRAHAM.